United States Patent
Ng et al.

(10) Patent No.: US 10,832,705 B2
(45) Date of Patent: Nov. 10, 2020

(54) INTERLACED MAGNETIC RECORDING BAND ISOLATION

(71) Applicant: Seagate Technology LLC, Cupertino, CA (US)

(72) Inventors: Wei Loon Ng, Singapore (SG); Brian T. Edgar, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/782,878

(22) Filed: Feb. 5, 2020

(65) Prior Publication Data
US 2020/0243107 A1    Jul. 30, 2020

Related U.S. Application Data

(62) Division of application No. 16/256,860, filed on Jan. 24, 2019, now Pat. No. 10,593,354.

(51) Int. Cl.
*G11B 5/09* (2006.01)
*G11B 5/02* (2006.01)
*G11B 5/55* (2006.01)

(52) U.S. Cl.
CPC .............. *G11B 5/02* (2013.01); *G11B 5/5534* (2013.01)

(58) Field of Classification Search
None
See application file for complete search history.

(56) References Cited

U.S. PATENT DOCUMENTS

| | | | | |
|---|---|---|---|---|
| 5,812,761 | A * | 9/1998 | Seki .................. | G11B 19/02 711/114 |
| 6,201,655 | B1 * | 3/2001 | Watanabe .............. | G11B 5/012 360/48 |
| 6,795,894 | B1 | 9/2004 | Neufeld et al. | |
| 7,283,321 | B1 | 10/2007 | Sun et al. | |
| 7,626,782 | B1 | 12/2009 | Yu et al. | |
| 7,684,144 | B1 * | 3/2010 | Goker .................... | G11B 5/584 360/77.12 |
| 8,125,723 | B1 | 2/2012 | Nichols et al. | |
| 8,902,535 | B1 | 12/2014 | Nie et al. | |
| 9,324,362 | B1 * | 4/2016 | Gao .................. | G11B 20/1833 |
| 9,472,223 | B1 * | 10/2016 | Mendonsa ......... | G11B 5/59638 |
| 9,666,213 | B1 * | 5/2017 | Erden ................ | G11B 20/1217 |
| 9,672,851 | B1 * | 6/2017 | Gao .................. | G11B 5/012 |
| 9,805,741 | B1 * | 10/2017 | Ma ...................... | G11B 5/09 |
| 10,068,597 | B1 * | 9/2018 | Jury .................... | G11B 5/3948 |
| 10,163,462 | B1 * | 12/2018 | Rice .................. | G11B 20/1217 |
| 10,347,285 | B1 * | 7/2019 | Granz ................ | G11B 20/1217 |
| 10,593,354 | B1 * | 3/2020 | Ng ...................... | G11B 5/5534 |

(Continued)

*Primary Examiner* — Peter Vincent Agustin
(74) *Attorney, Agent, or Firm* — Holzer Patel Drennan

(57) ABSTRACT

Methods and apparatus for allocating logical sectors and bands to store data on interlaced magnetic recording tracks. The systems and methods include formatting a data storage medium to include a plurality of bands, each band of the plurality of bands including a plurality of tracks, the plurality of tracks including a subset of top tracks interlaced with a subset of bottom tracks, and each track of the plurality of tracks including a number of sectors, formatting a first band of the plurality of bands, determining an isolation region of the first band, and formatting a second band of the plurality of bands responsive to determining the isolation region of the first band.

20 Claims, 10 Drawing Sheets

(56) References Cited

U.S. PATENT DOCUMENTS

2012/0099216 A1* 4/2012 Grobis .................. G11B 5/746
  360/39
2016/0148625 A1* 5/2016 Zhu .................... G11B 20/1889
  360/48

* cited by examiner

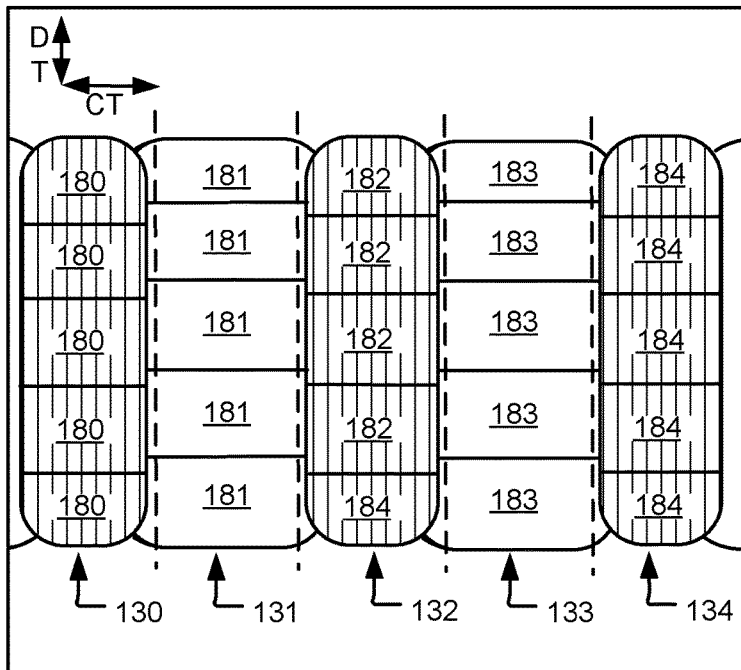
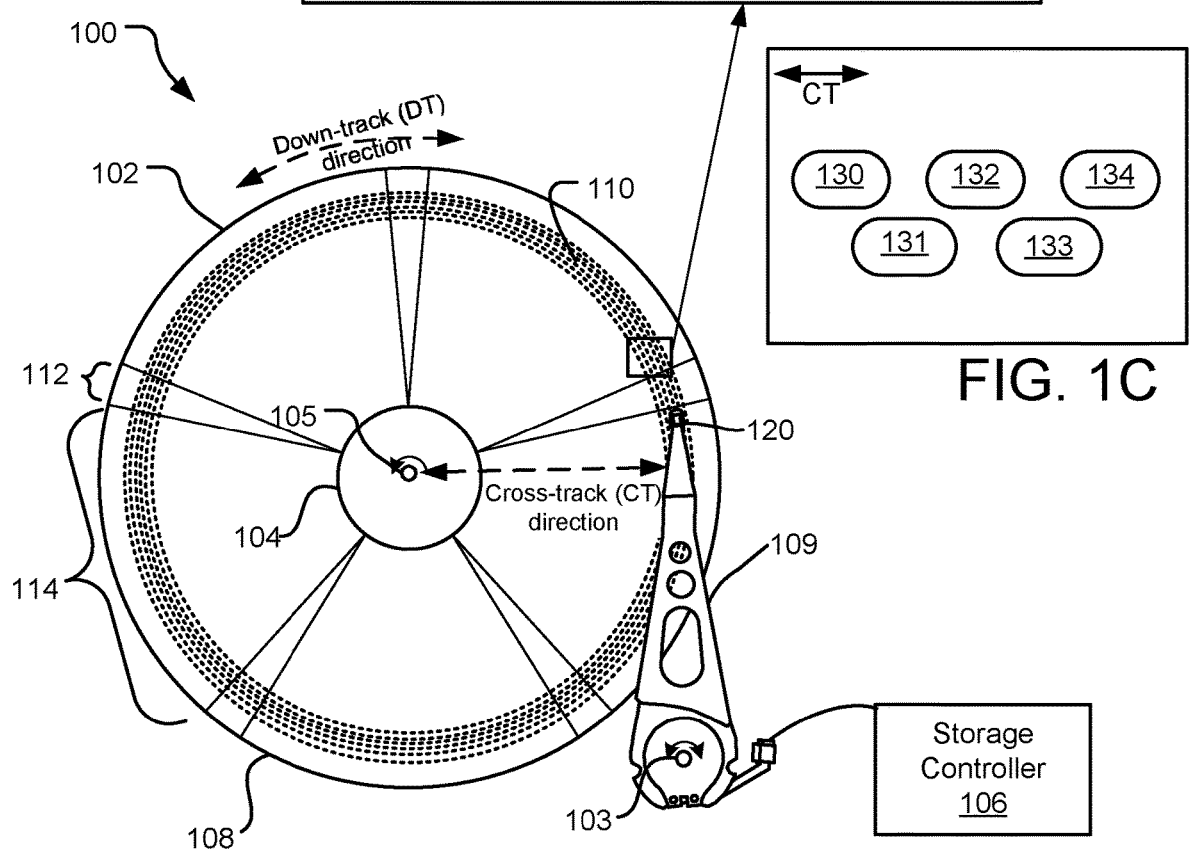
FIG. 1B
FIG. 1C
FIG. 1A

INTERLACED MAGNETIC RECORDING BAND ISOLATION

CROSS-REFERENCE

This application is a divisional application of U.S. patent application Ser. No. 16/256,860 filed Jan. 24, 2019 and titled INTERLACED MAGNETIC RECORDING BAND ISOLATION, the entire disclosure of which is incorporated herein by reference for all purposes.

BACKGROUND

Interlaced magnetic recording (IMR) generally refers to the concept of utilizing two or more selected written track widths and two or more different linear densities for data writes to alternating data tracks on a storage medium. In these systems, data tracks may be read from or written to the data tracks in a non-consecutive order. For example, data may be written exclusively to a first track series including every other data track in a region of a storage medium before data is written to any data tracks interlaced between the tracks of the first series.

SUMMARY

Systems and methods are disclosed for allocating logical sectors to store interlaced magnetic recording (IMR) bands. The systems and methods include formatting a data storage medium to include a plurality of bands, each band of the plurality of bands including a plurality of tracks, the plurality of tracks including a subset of top tracks interlaced with a subset of bottom tracks, and each track of the plurality of tracks including a number of sectors, formatting a first band of the plurality of bands, determining an isolation region of the first band, and formatting a second or next band of the plurality of bands responsive to determining the isolation region of the first band. The formatting of the band and determination of the isolation region is accomplished via an iterative supposition process.

In one particular implementation, a method for formatting a data storage medium to include a plurality of bands with an isolation region between adjacent bands, each band comprising a plurality of tracks, the plurality of tracks comprising a subset of top tracks interlaced with a subset of bottom tracks, and each track comprising a number of sectors, is provided. The method includes formatting a preliminary band comprising a number of sectors such that the subset of bottom tracks are configured to store data and none of the subset of top tracks are configured to store data. The preliminary band is iteratively reformatted such that the subset of bottom tracks is configured to store one fewer sectors than a prior iteration of the preliminary band, and the subset of top tracks is configured to store one sector further than the prior iteration of the preliminary band, the number of sectors configured to store data in the band being kept constant, wherein iteratively reformatting comprises discarding from the preliminary band any bottom track no longer intended to store data. After iteratively reformatting, finalizing the format of the band when an isolation region (a region prior to the start of the next band where no data is to be stored) can be formatted comprising no more than one entire track or circumferentially complementary portions of two adjacent tracks. In some implementations, the bottom and top tracks configured to store data may also be characterized as being planned to store data, meaning that is the intention of the method at the time of formatting.

In another particular implementation, a method for formatting a data storage medium to include a plurality of bands with an isolation region between adjacent bands, each band comprising a plurality of tracks, the plurality of tracks comprising a subset of top tracks interlaced with a subset of bottom tracks, and each track comprising a number of sectors, is provided. This method includes filling the subset of bottom tracks with data, iteratively moving data from a sector of the subset of bottom tracks to a sector of the subset of top tracks, until the number of empty top tracks inward from the end non-empty bottom track is zero; and assigning an isolation region responsive to a determination if the subset of bottom tracks has a non-full track, assigning that portion of the non-full track as a first portion of the isolation region, and assigning a corresponding portion of an adjacent top track as a second portion of the isolation region, or if the subset of bottom tracks does not have a non-full track, assigning no more than an entire adjacent top track as the isolation region.

The disclosure provides formatting a first IMR band such that, at an extreme, an isolation region can be formatted comprising of a full track or circumferentially complementary portions of adjacent tracks (e.g., top/bottom or bottom/top), and responsive to formatting the first band and the isolation region, formatting a subsequent IMR band. The iterative supposition (1) provides a framework to prove that an IMR band can be formatted from nonzero-sized IMR tracks with an end-most configuration satisfying specific configurations, and (2) providing an algorithm for formatting the IMR band. It should be understood that when discussion is made regarding filling tracks and iteratively moving data, that actual data may not be written and/or moved, but that the process of writing and moving data is theoretical.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWING

The described technology is best understood from the following Detailed Description describing various implementations read in connection with the accompanying drawing.

FIG. 1A is a schematic plan view of an example disc drive assembly; FIG. 1B is a plan view of an enlarged portion of the example disc drive assembly showing a plurality of interlaced magnetic recording (IMR) tracks; FIG. 1C is a schematic side view of the enlarged portion of the example disc drive assembly showing the plurality of IMR tracks.

DETAILED DESCRIPTION

Figure 2A:
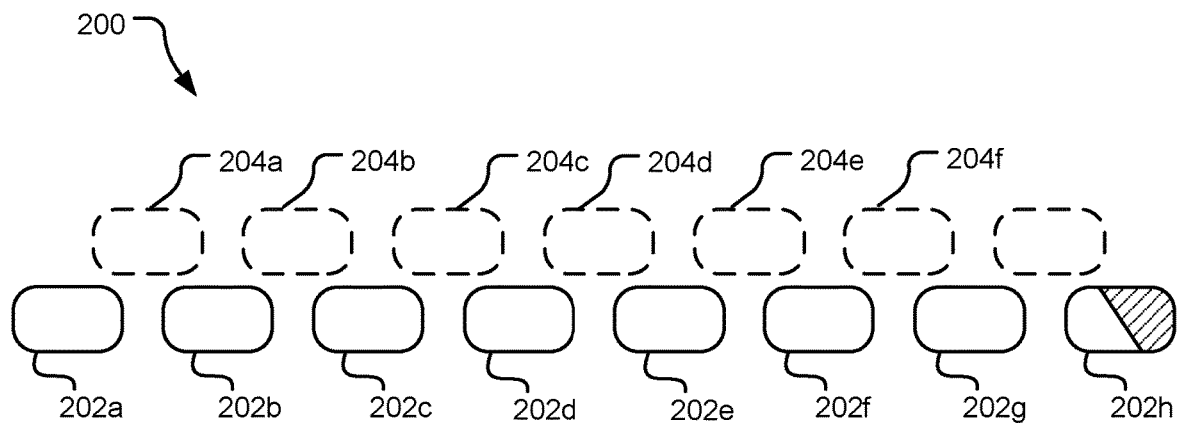
FIGS. 2A, 2B and 2C are schematic side views of a plurality of IMR tracks showing steps in an iterative supposition process.

As requirements for area storage density increase for magnetic media, cell size decreases. A commensurate decrease in the size of a write element is difficult because in many systems, a strong write field is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is interlaced magnetic recording (IMR).

As explained in further detail with reference to the various figures below, IMR systems may utilize two or more selected written track widths and two or more different linear densities for data writes to alternating data tracks on a storage medium. In these systems, data tracks may be read from or written to the data tracks in a non-consecutive order. For example, data may be written exclusively to a first track series including every other data track in a region of a storage medium before data is written to any data tracks interlaced between the tracks of the first series.

In IMR systems, a data track of wide written track width is written prior to directly adjacent data tracks of narrower written track width. The data tracks of the wider written track width are also referred to herein as "bottom tracks," while the alternating data tracks of narrower written width are referred to herein as "top tracks." In some implementations, the bottom tracks of wider written track width include data stored at a different linear density than one or more top tracks of narrow written track width. In still other implementations, the bottom and top data tracks are of equal written track width.

IMR can allow for significantly higher areal recording densities than many existing data management systems. However, effective IMR systems are designed to implement prioritized write access rules that can, in some implementations, entail significant read/write overhead. For instance, modifying a target data track in an IMR system may entail reading two or more adjacent top tracks into memory, modifying the target bottom track, and re-writing the two or more adjacent top tracks.

As described in more detail below with respect to the figures, in host-managed IMR and drive-managed IMR, it is advantageous to have individually rewritable IMR bands of a logically uniform size with minimum overprovisioning for isolation of the bands one from another. The herein disclosed technology includes allocating the logical sectors needed to store an IMR band, possibly of a specific, possibly of a uniform logical size, to variably-sized IMR tracks at a locality on the surface of a storage media.

Specifically, the disclosed technology is directed toward achieving isolation of IMR bands at an overprovisioning cost of one track's worth of sectors per iso-band, where a plausible worst case for that track size (e.g., considering a track's worth of sectors) being that of a bottom track in the region of the IMR band (e.g., the bottom tracks having more sectors per track on average than the top tracks).

For purposes of this disclosure, the disclosed technology is described in an IMR data storage system. Other storage systems are contemplated, e.g., a perpendicular IMR system, a heat-assisted IMR system (HIMR), etc.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1A illustrates in plan view of an example disc drive assembly 100 that includes a magnetic storage medium 102 and a transducer head assembly 120 with a writer and reader (not shown) for writing and reading data to and from the magnetic storage medium 102. The transducer head assembly 120 may include any of a number of reader and writer configurations such as HAMR (Heat-Assisted Magnetic Recording), multiple read and/or write heads, etc. Although other implementations are contemplated, the magnetic storage medium 102 is, in FIG. 1A, a magnetic storage disc on which data bits can be recorded using a magnetic write pole and from which data bits can be read using a magnetoresistive element (not shown). As illustrated in FIG. 1A, the magnetic storage medium 102 has an inner diameter 104 and an outer diameter 108 between which are a number of concentric data tracks 110. The medium 102 rotates about a spindle center or a disc axis of rotation 105. Information may be written to and read from data bit locations in the data tracks 110 as the magnetic storage medium 102 rotates.

The magnetic storage medium 102 includes a number of servo sectors 112 extending radially between the inner diameter 104 and the outer diameter 108; five servo sectors are illustrated in FIG. 1A. In one implementation, each of the servo sectors 112 includes embedded information used for track seeking and track following, such as fine head position information used for centerline tracking. Between every two consecutive servo sectors 112 is a wedge 114 that includes multiple sectors (e.g., data sectors and super parity sectors, not shown) of concentric data tracks 110.

The transducer head assembly 120 is mounted on an actuator assembly 109 at an end distal to an actuator axis of rotation 103. The transducer head assembly 120 flies in close proximity above the surface of the magnetic storage medium 102 during disc rotation. The actuator assembly 109 rotates or pivots during a seek operation about the actuator axis of rotation 103 to position the transducer head assembly 120 over a target data track 110 during read and write operations.

The disc drive assembly 100 further includes a storage controller 106. The storage controller 106 includes software and/or hardware and may be implemented in any tangible processor-readable storage media within or communicatively coupled to the disc drive assembly 100, particularly, to the actuator assembly 109. The term "tangible processor-readable storage media" includes, but is not limited to, RAM, ROM EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by a processor. In contrast to tangible processor-readable storage media, intangible processor readable communication signals may embody processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. In some implementations, a look-up table may be included in a read/write subsystem to locate a starting track of each band.

FIG. 1B illustrates a magnified view of a section of the data tracks 110 of the magnetic storage medium 102. FIG. 1B illustrates multiple data tracks 130, 131, 132, 133, 134 intended to store data according to an interlaced magnetic recording (IMR) configuration or technique. The data tracks 130, 131, 132, 133, 134 are each divided into data sectors (e.g., data sectors 180, 181, 182, 183, 184, respectively) which include a plurality of polarized regions (not shown), also referred to as "data bits," each representing one or more individual data bits of the same state (e.g., 1s or 0s).

The illustrated IMR technique utilizes alternating data tracks of different written track widths arranged with slightly overlapping written track boundaries so that a center-to-center distance between directly adjacent tracks (e.g., the track pitch) is uniform across an area (e.g., a radial zone or across an entire surface of the magnetic storage medium 102). Specifically, FIG. 1B illustrates a first series of alternating tracks (e.g., the tracks 131 and 133) with a wider written track width than a second series of alternating data tracks (e.g., the tracks 130, 132, and 134). The first series of alternating tracks are referred to as "bottom tracks", and the second series of alternating tracks are referred to as "top tracks;" in another way, the wider alternating tracks are referred to as "bottom tracks" and the narrow alternating tracks are referred to as "top tracks." FIG. 1C illustrates the tracks 131, 133 as "bottom tracks" and the tracks 130, 132, 134 as "top tracks".

Typically, each wide data track (bottom track) of a series of tracks is written before any directly-adjacent data track (top track) of the second series is written. For example, the data track 131 is written before either of the data tracks 130 and 132 is written. Data subsequently written to the data tracks 130 and 132 may overwrite the outer edge portions of the previously-written data track 131; however, the data track 131 is still readable due to sufficient information retained in a center region of the data track 131.

One consequence of IMR is that a bottom track (e.g., a data track 131) is not randomly writable when data is stored on a directly adjacent top data track (e.g., the data track 130 or 132). As used herein, a data track is "randomly writable" when the data track can be individually re-written multiple times without significantly degrading data on other adjacent data tracks. An adjacent data track is "significantly degraded" if reading the data track results in a number of read errors in excess of a maximum number of errors that can be corrected by an error correction code (ECC) of the disc drive assembly 100.

Top tracks (e.g., data tracks 130, 132, 134) are generally randomly writable because they can be individually rewritten without degrading data on adjacent (bottom) data tracks (e.g., tracks 131, 133). However, some implementations of IMR systems have issues with servo write off track (SWOT), meaning that the write head of the transducer head 120 writes off center of the target track and into an adjacent track resulting in a degradation of the data on the adjacent track. For example, if transducer head 120 is writing on top track 132 it may write off center of the top track 132 (e.g., toward the bottom track 131), which may degrade the data on the bottom track 131. When the transducer head 120 suffers from SWOT such as in the example described above, it may not have an effect on the opposing top track (e.g., the top track 130). Only the adjacent bottom track 131 may be affected. For a given track spacing, it may not be safe to overwrite top track sectors more than once due to the incremental risk of impacting the bottom tracks. In some implementations, the risk of detrimental impact to the bottom tracks is tolerable for one write but is typically not tolerable for more than one top track overwrite.

A set of tracks (e.g., tracks 130, 131, 132, 133, 134) may be grouped into a "band," with the band having a guard track or portion(s) of track(s) that isolates the band from the next group of tracks or next band; for example, a guard track (not shown in FIG. 1) may be present adjacent to track 130 and/or track 134. A guard track or portion(s) of track(s) can be also referred to as an "isolation track," and is designated as not to be written. The isolation track provides band boundaries to separate writable tracks of different bands and to guard the last track of a band. Drive managed and host managed IMR separates bands with guard tracks so that rewriting a track in the band does not require rewriting tracks outside that band.

The disc space allotted for a band may be chosen before the disc space for a subsequent and/or adjacent band is chosen. The allocation of disc space for a band can depend on the sectors (e.g., sectors 181, 183) of the track(s) (e.g., tracks 131, 133) under consideration. The number and/or size of sectors per track can vary between the bottom tracks and the top tracks; media variations (e.g., variable bit aspect ratio) can also vary between the bottom tracks and the top tracks. On average, bottom tracks have more sectors per track than top tracks. However, in some implementations, the number of sectors per track also varies based on defects in the band, track or sectors.

The technology described herein includes allocating the sectors to store an IMR band (e.g., 256 MiB of data) to the variably sized IMR tracks at that locality on the surface of the magnetic storage medium 102. In an ideal situation, a band fills an entire track length, leaving the adjacent track as an isolation or guard track. However, bands may start and end at radially varying locations on the medium 102 such that the last track (in a band) is not necessarily a full track. Instead, a partial last or end track (e.g., "rightmost" end track) is either a partial top track or a partial bottom track. In such a scenario, the end partially full track is "spooned" together with the adjacent, alternate type of track (e.g., bottom-top or top-bottom). These two partial tracks are then designated as the isolation or guard region. The specific and optimal location of these isolation or guard regions, whether a full track or partial tracks forming a region, can be determined by iterative supposition.

The iterative supposition process, to determine the location of isolation or guard regions for an IMR technique, as per this disclosure, iteratively moves representations of data (e.g., 256 MiB of data) to form a consolidated band, taking into account defective and otherwise unusable sectors. The iterative supposition process involves no writing of actual data, but moving representative data to reach a final assignment of sectors to tracks to form the band. The iterative supposition accounts for variation in the sectors size, numbers of sectors, defects in the sectors, etc.; thus, each resulting consolidated band is optimized. There may be variably sized tracks in a band, with different numbers of sectors on each track.

To begin the iterative supposition process, a series of tracks (e.g., bottom tracks) is theoretically filled with one band of data (e.g., 256 MiB). FIG. 2A illustrates a preliminary configuration 200 having a series of tracks 202 (particularly, tracks 202a, 202b, 202c, 202d, 202e, 202f, 202g, 202h) that together have one band of (theoretical) data therein. The tracks 202a, 202b, 202c, 202d, 202e, 202f, 202g are full tracks (e.g., all the sectors are full) whereas the track 202h (shown with crosshatch) is only partially full. A second series of tracks 204 (e.g., top tracks), particularly, tracks 204a, 204b, 204c, . . . are shown in phantom, but no data is provided to those tracks 204 initially. As illustrated, the first series of tracks 202 are bottom tracks, and the second series of tracks 204 are top tracks.

Figure 2B:
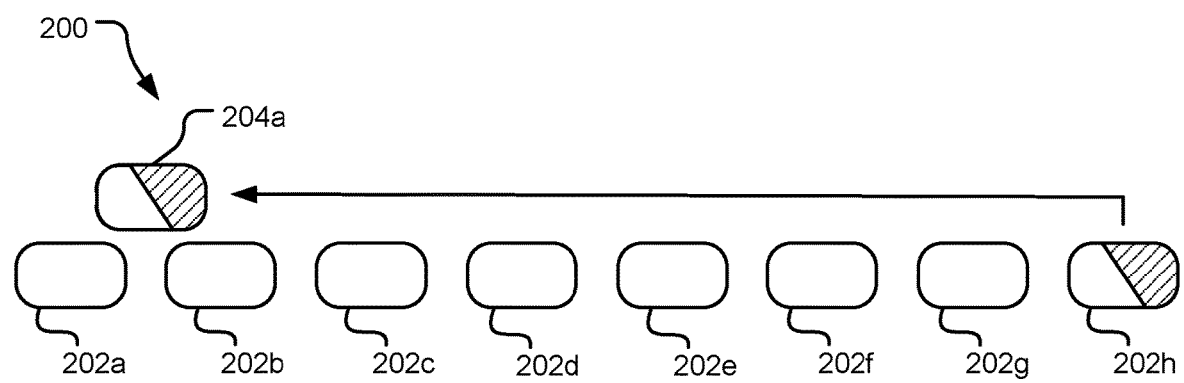

FIG. 2B illustrates a step of the iterative supposition process, beginning with the preliminary, theoretical data configuration of FIG. 2A and leading to a final IMR band. In this supposition step, one sector is shifted at a time from the last or end bottom track to the last or end available top track, in an incremental supposition. FIG. 2B, specifically, shows top track 204a, which was empty in FIG. 2A, being filled, sector by sector, from bottom track 202h.

Figure 2C:
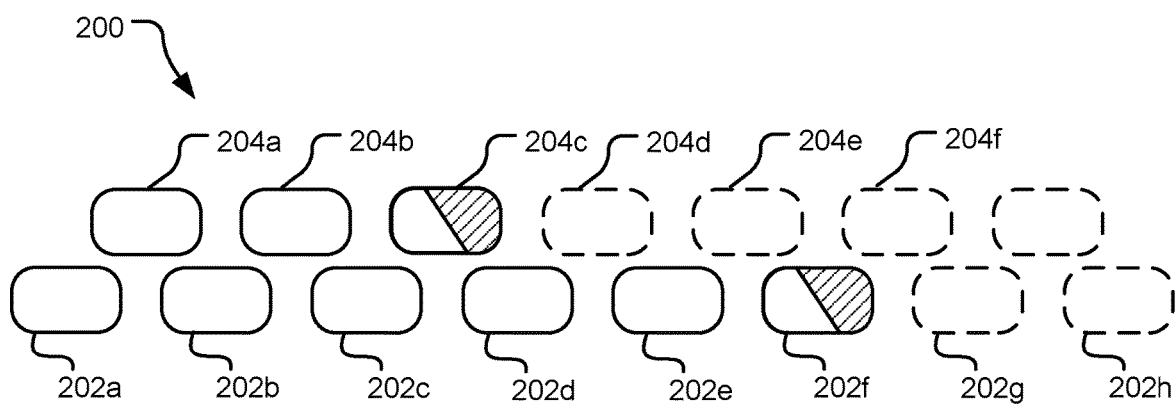

FIG. 2C shows a later intermediate step of the iterative supposition process, where a sufficient number of iterative steps have occurred so that bottom tracks 202h and 202g are empty, bottom track 202f is partially full, top tracks 204a and 204b are full, and top track 204c is partially full.

The iterative supposition process drains the bottom tracks (e.g., tracks 202) and fills the top tracks (e.g., tracks 204). Although the iterative supposition ends (as discussed later) with a completed band layout with a completed and condensed allocation of sectors to both the bottom and top tracks, one or both of the end tracks (e.g., rightmost top track, rightmost bottom track) may be partially full. In other implementations, the end track(s) may not be partially full, but be completely full. A track that is partially full may have, e.g., only one sector that is full and the rest of the sectors empty, or only one sector empty and the rest of the sectors full, or any empty/full distribution.

Figure 3A:
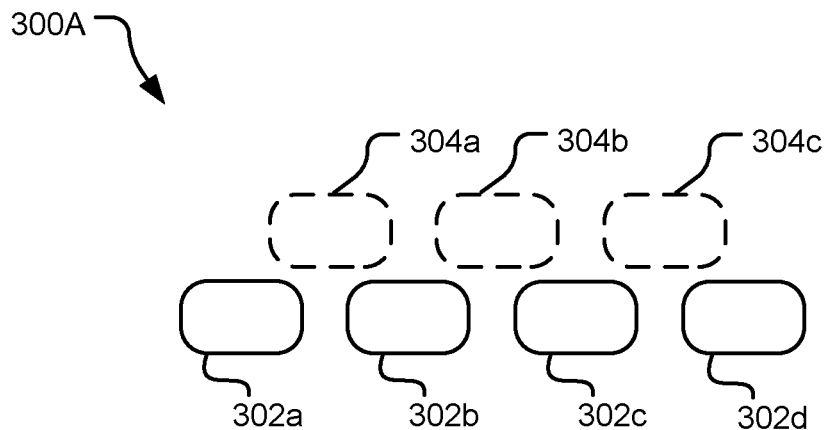
FIGS. 3A, 3B and 3C are three schematic side views of a plurality of IMR tracks showing N=3, N=2, and N=0, respectively.
Figure 3B:
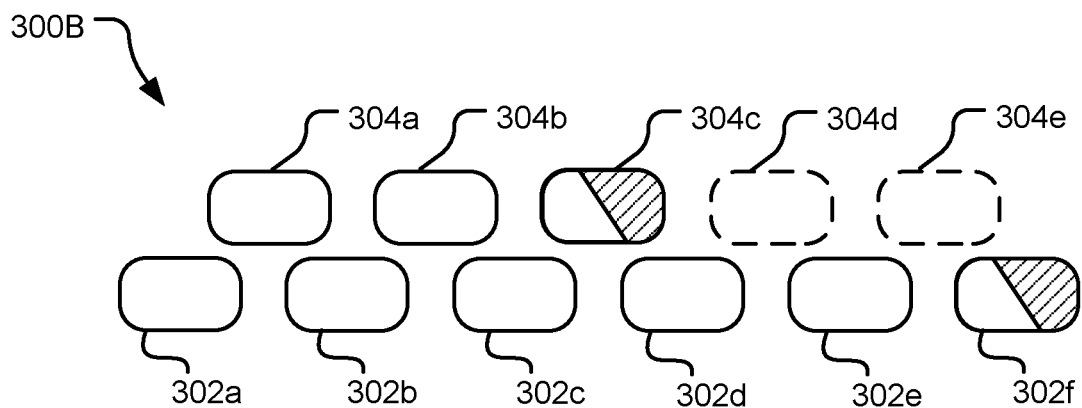
Figure 3C:
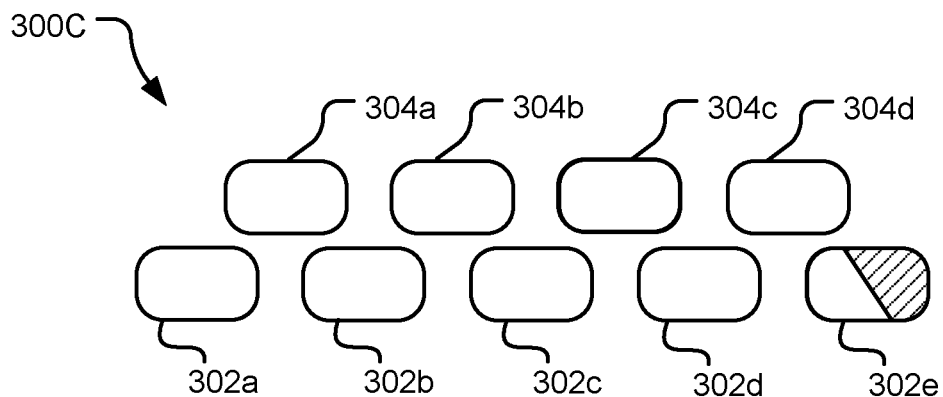

During the iterative supposition process, there is a track number "N" which is the number of empty top tracks inward from the end non-empty bottom track (e.g., the number of empty top tracks to the left of the rightmost non-empty bottom track). FIGS. 3A, 3B and 3C show layouts where N=3, N=2 and N=0, respectively. In these figures, the bottom tracks are identified generally as tracks 302 and the top tracks are identified generally as tracks 304.

In FIG. 3A specifically, the configuration 300A has bottom tracks 302a, 302b, 302c, 302d that are full tracks and top tracks 304a, 304b, 304c that are empty. There are three empty top tracks from the end non-empty bottom track, so that N=3.

In FIG. 3B specifically, the configuration 300B has bottom tracks 302a, 302b, 302c, 302d, 302e that are full tracks, bottom track 302f is partially full, top tracks 304a, 304b are full, and top track 304c is partially full. Top tracks 304d, 304e are empty. There are two empty top tracks from the end non-empty bottom track, so that N=2.

In FIG. 3C specifically, the configuration 300C has bottom tracks 302a, 302b, 302c, 302d that are full tracks, bottom track 302e is partially full, and top tracks 304a, 304b, 304c, 304d are full. There are no empty top tracks from the end non-empty bottom track, so that N=0.

In some implementations, at the beginning of the iterative supposition process, as shown in FIG. 2A, N is at least 3, in some implementations at least 4, due to the number of tracks in a series (e.g., bottom level of tracks) needed for one band of data. FIG. 2A actually shows N=7.

During the iterative supposition process, a shift of a single sector from a bottom track to a top track will decrease N by 0 (zero), 1 or 2. For example, if as a result of a sector shift the endmost bottom track is emptied but the endmost top track remains partially full, N has decreased by 1. As another example, if as a result of a sector shift the endmost bottom track remains partially full and the endmost top track is started (and is now partially full), N has decreased by 1. As another example, if as a result of a sector shift the endmost bottom track is emptied and the endmost top track is started, N has decreased by 2. In all implementations, after each iteration, the bottom tracks have one less sector and the top tracks have one more sector; in other words, one sector is shifted in each iteration. Continued iterative supposition will arrive at a completed band as described below.

Figure 4A:
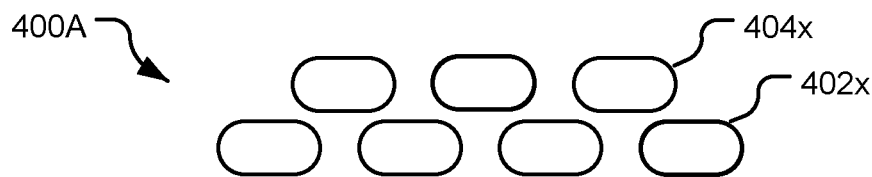
FIGS. 4A, 4B, 4C, 4D, 4E and 4F are six schematic side views of a plurality of IMR tracks.
Figure 4B:
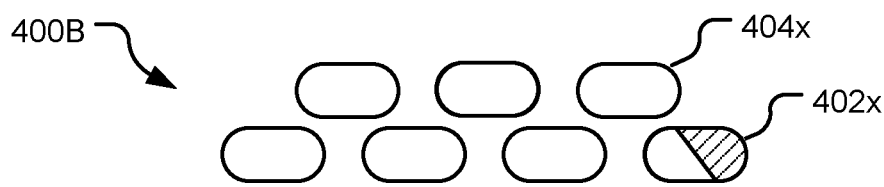
Figure 4C:
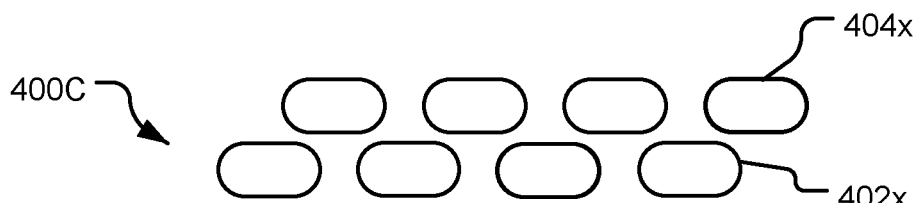
Figure 4D:
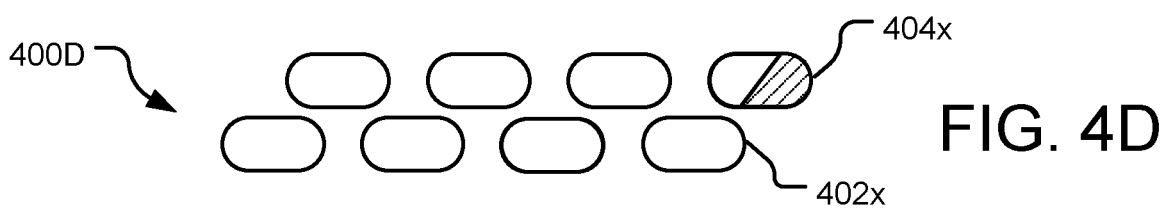

FIGS. 4A, 4B, 4C, 4D, 4E and 4F illustrate four examples where N=0 (FIG. 4A, FIG. 4B, FIG. 4E, and FIG. 4F), and two examples where N is negative 1 (FIG. 4C and FIG. 4D). In all these examples, the endmost top track and the endmost bottom track are both non-empty (e.g., full or partially full).

FIG. 4A illustrates a configuration 400A where the endmost bottom track 402x is full and the endmost top track 404x is full. This configuration 400A can also be referred to as "Case #1."

FIG. 4B illustrates a configuration 400B where the endmost bottom track 402x is partially full and the endmost top track 404x is full. This configuration 400B can also be referred to as "Case #2."

FIG. 4C illustrates a configuration 400C which is configuration 400A flipped. where the endmost bottom track 402x is full and the endmost top track 404x is full. This configuration 400C can also be referred to as "Case #3."

FIG. 4D illustrates a configuration 400D the endmost bottom track 402x is partially full and the endmost top track 404x is full, which is configuration 400B flipped. This configuration 400D can also be referred to as "Case #4."

Figure 4E:
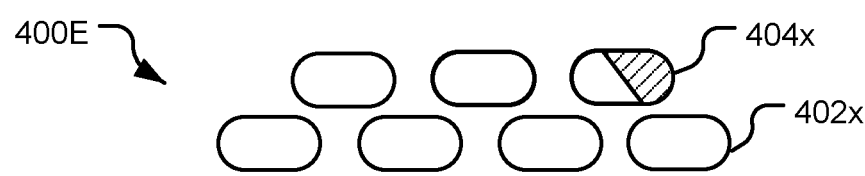

FIG. 4E illustrates a configuration 400E where the endmost bottom track 402x is full and the endmost top track 404x is partially full.

Figure 4F:
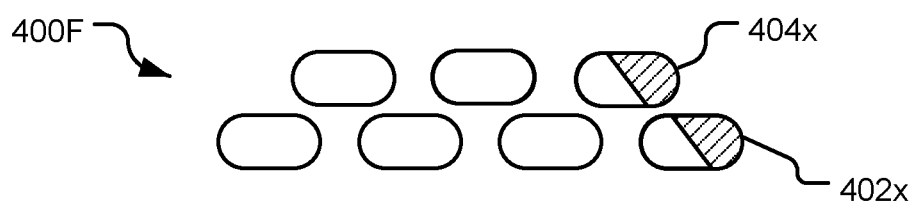

FIG. 4F illustrates a configuration 400F where both the endmost bottom track 402x and the endmost top track 404x are partially full.

Although the configuration 400E of FIG. 4E and the configuration 400F of FIG. 4F have N=0, the iterative supposition process can be continued on these configurations to eventually arrive at one of the configurations of FIG. 4A (Case #1), FIG. 4B (Case #2), FIG. 4C (Case #3) or FIG. 4D (Case #4).

After arriving at one of the configurations of FIG. 4A (Case #1), FIG. 4B (Case #2), FIG. 4C (Case #3) or FIG. 4D (Case #4), the iterative supposition is complete, the band has been consolidated, and the location of band boundary has been determined. The isolation region is thus assigned.

Figure 5A:
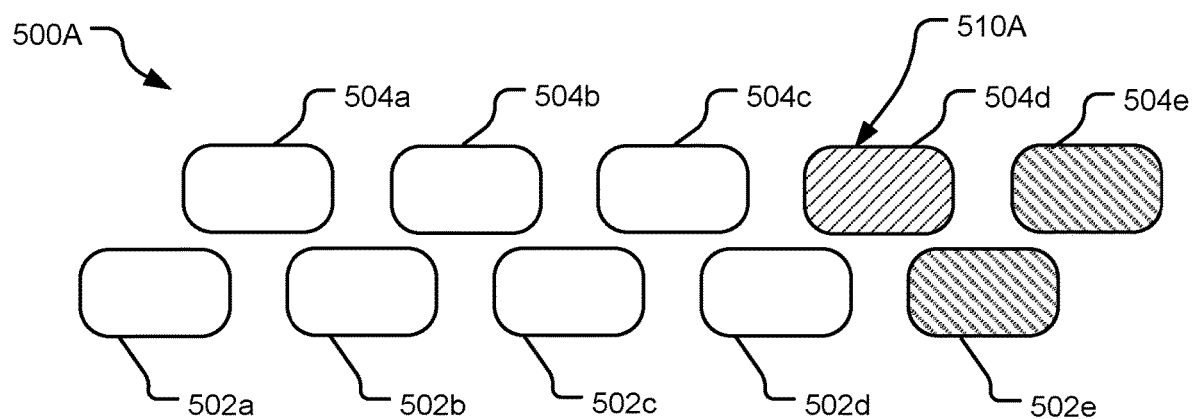
FIG. 5A is a schematic side view of an IMR band arrangement with a track as an isolation region.
Figure 5B:
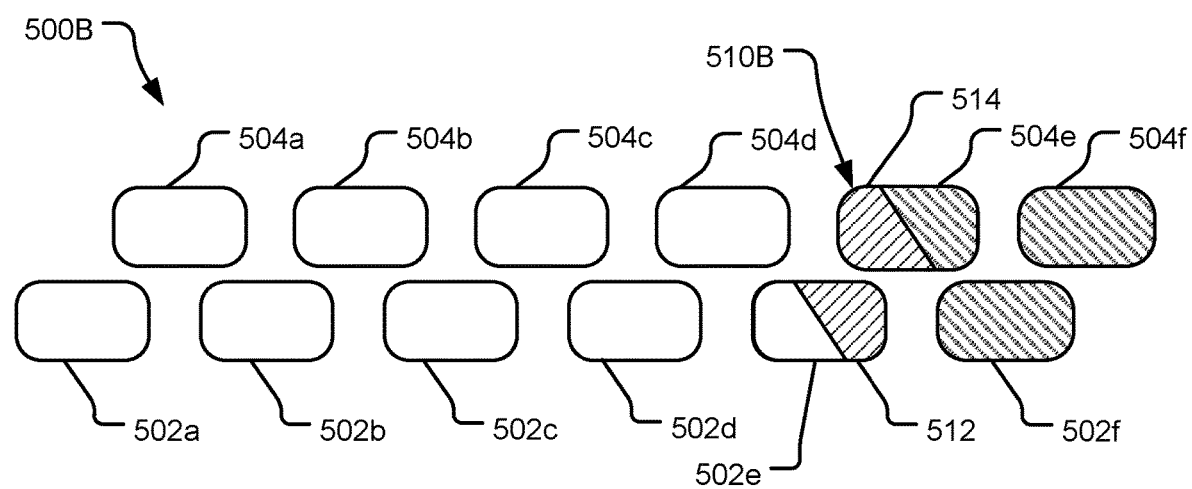
FIG. 5B is a schematic side view of an IMR band arrangement with circumferentially complementary portions of two adjacent tracks as an isolation region.

Depending on the configuration of the band, the isolation region may be a single track or may be a first portion on a first track and a second portion on an adjacent track, the portions being circumferentially complementary. FIG. 5A illustrates an isolation or guard region formed by a full track between two adjacent bands based on the configuration 400A of FIG. 4A. FIG. 5B illustrates an isolation or guard region between two circumferentially complementary portions of adjacent tracks based on the configuration 400B of FIG. 4B.

In FIG. 5A, the configuration 500A has a band formed by bottom tracks 502a, 502b, 502c, 502d and top tracks 504a, 504b, 504c; all of these tracks 502a, 502b, 502c, 502d, 504a, 504b, 504c are full. The next adjacent track, top track 504d is empty, and is thus designated as an isolation or guard track 510A. The tracks 502e, 504e are the beginning of the next adjacent band.

In FIG. 5B, the configuration 500B has a band formed by full bottom tracks 502a, 502b, 502c, 502d, partially full bottom track 502e, and full top tracks 504a, 504b, 504c, 504d. An isolation or guard track 510B is defined by the empty portion 512 of the bottom track 502e and a sufficient portion 514 of the top track 504e to form, with empty portion 512, an isolation or guard region 510B that has approximately the same number of sectors as a full track. The next adjacent band includes part of the top track 504e (the part that is not portion 514), bottom track 502f, top track 504f, and subsequent tracks.

The bands and the isolation or guard regions reflect the end result of the iterative supposition process. The resulting band is optimally consolidated, taking into account unusable sectors (e.g., defective sectors), so that the location of the isolation region can be determined.

Figure 6:
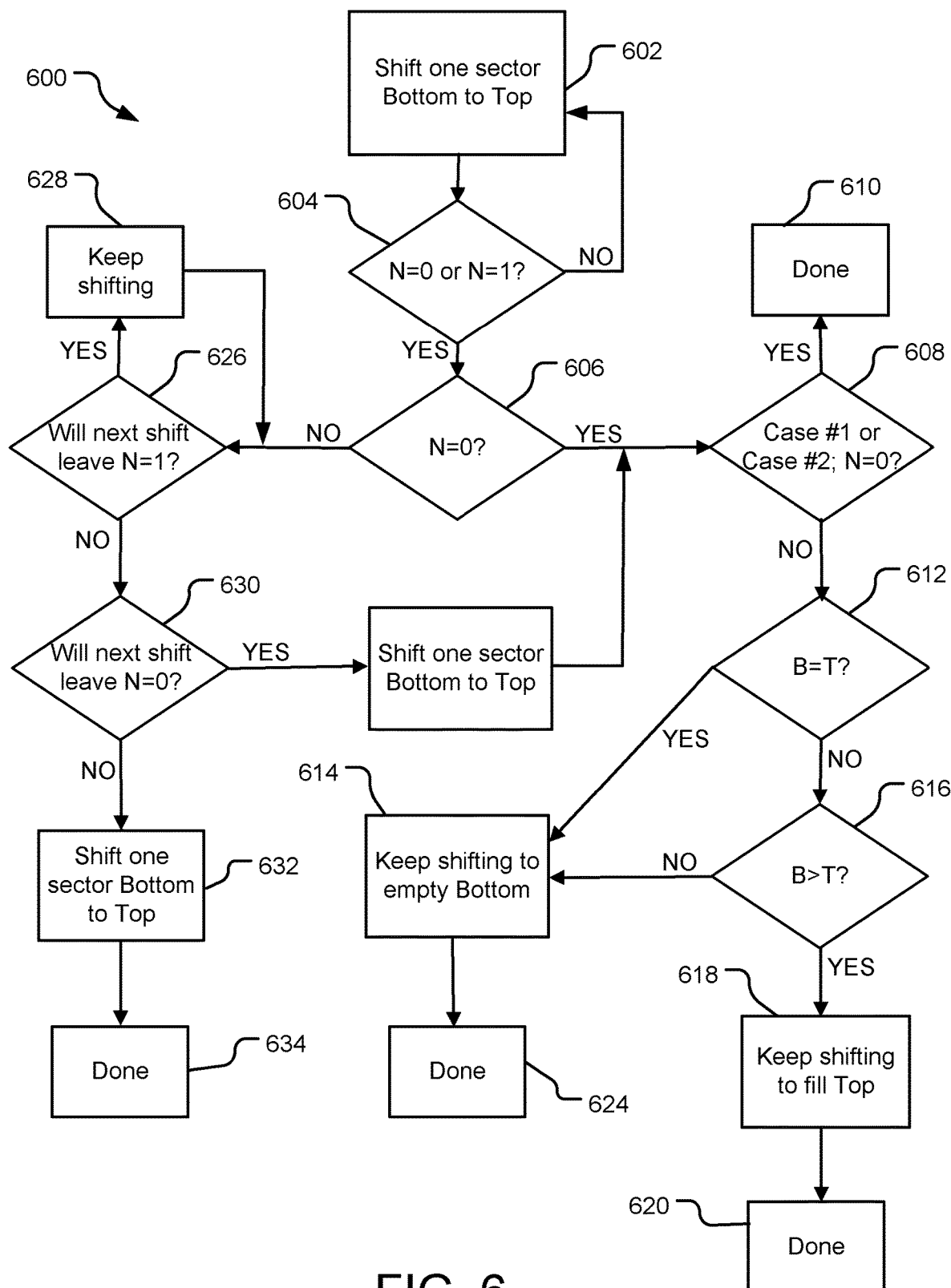
FIG. 6 is a logical flowchart of an iterative supposition process.

FIG. 6 shows a method 600, in stepwise manner, of the overall iterative supposition process used to determine the area needed for a consolidated band of data.

Initially, lower tracks of an IMR system are filled with one band's worth of representative data (e.g., 256 MiB), as is shown in FIG. 2A. In operation 602 in FIG. 6, one sector is shifted from the endmost bottom track to the endmost top track. In operation 604, it is evaluated whether or not N=0 or N=1, where N= is the number of empty top tracks inward from the endmost non-empty bottom track. If N=0 or N=1, the process progresses to operation 606; if N is other than 0 or 1 (e.g., N=2), return to operation 602 and continue shifting one sector from the endmost bottom track to the endmost top track.

From operation 606, if N=0 then progress to operation 608; at this step, if N=0 and the configuration is either Case #1 (FIG. 4A) or Case #2 (FIG. 4B), then the iterative supposition is done, operation 610. However, if at operation 608, if both N=0 and the configuration is either Case #1 (FIG. 4A) or Case #2 (FIG. 4B) are not true, then at operation 612 it is determined whether the unshifted supposed sector content in the endmost bottom track (B) is the same as the available space in the endmost top track (T). If yes, then progress to operation 614 where iterative supposition continues shifting sectors from the endmost bottom track to supposedly empty the bottom track, until the iterative supposition is done at operation 624. This operation is characterized as supposedly empty because, as initiated above, the data and movement of data during the process, in some implementations, can be considered theoretical. However, if at operation 612 it is determined that the unshifted supposed sector content in the endmost bottom track (B) is not the same as the available space in the endmost top track (T), then go to operation 616, where it is determined whether the unshifted supposed sector content in the endmost bottom track (B) is more than the available space in the endmost top track (T). If yes, then go to operation 618 where iterative supposition continues shifting sectors from the endmost bottom track to fill the endmost top track, until the iterative supposition is done at operation 620.

If at operation 616 it is determined that the unshifted supposed sector content in the endmost bottom track (B) is not more than the available space in the endmost top track (T), then progress to operation 614 where iterative supposition continues shifting sectors from the endmost bottom track to empty the bottom track, until the iterative supposition is done at operation 624.

Returning to operation 606, if N is not equal 0 then progress to operation 626. At operation 626, if the next shift will leave N=1, then go to operation 628 to continue shifting and return to operation 626 until it is determined the next shift will not leave N=1; when this occurs, progress to operation 630. At operation 630, if the next shift will leave N=0, then shift one sector from the bottom to the top and progress to operation 608, where it is evaluated if it is Case #1 (FIG. 4A) or Case #2 (FIG. 4B). However, if at operation 630 the next shift will not leave N=0, then progress to operation 632 where iterative supposition performs one final shift to finish at operation 634.

Figure 7:
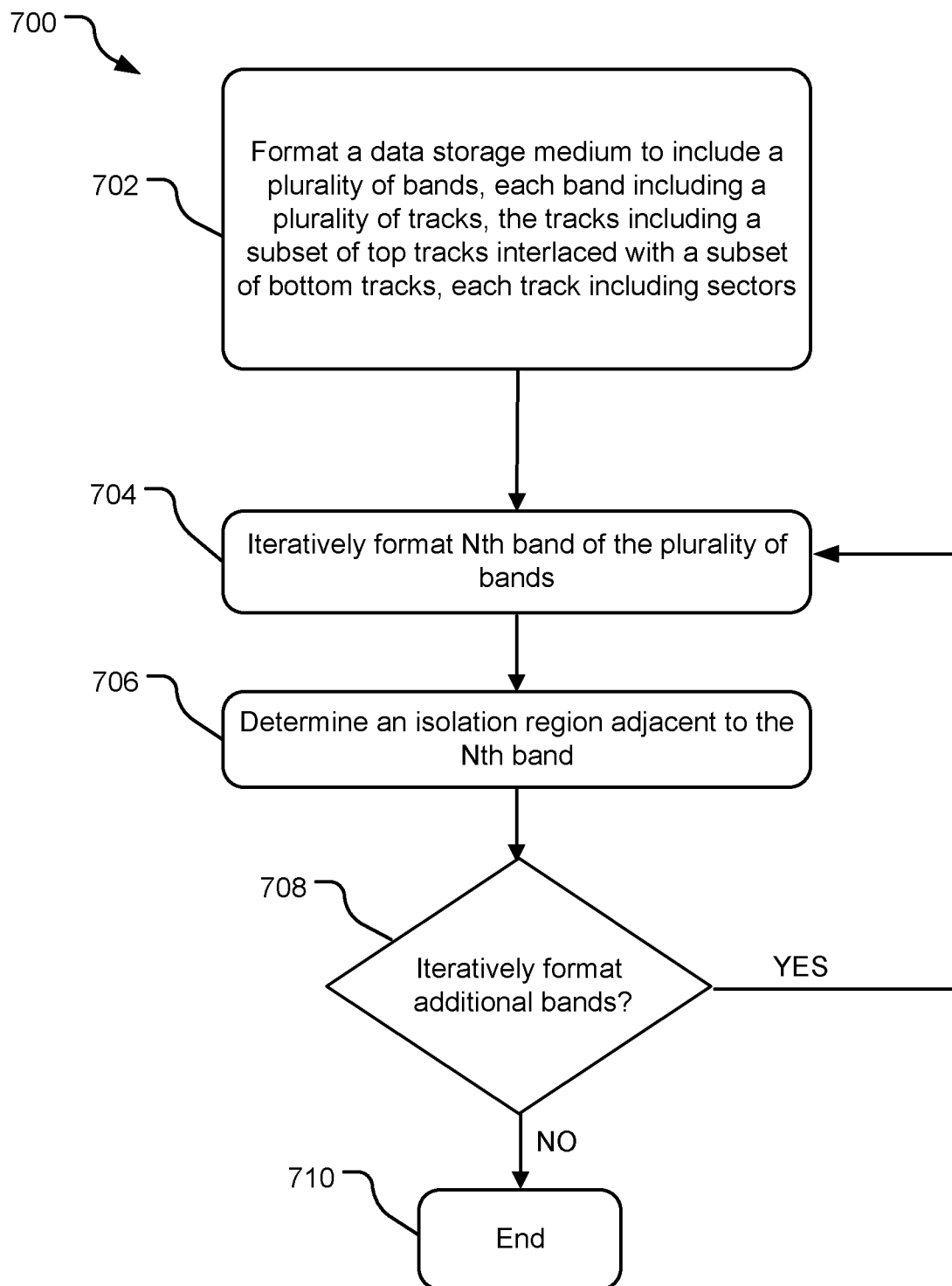
FIG. 7 is a flowchart of a general process for formatting an IMR system.

Referring to FIG. 7, a flowchart of operations for allocating disc space in the storage medium by identifying a boundary of the first band and separating writable tracks of different bands is provided. The process 700 may comprise configuring a first band with a designated capacity (e.g., 256 MiB). The designated capacity may include an initial number of non-defective sectors, to which may or may not be added one or two spare sectors or tracks, for example, to compensate for defective sectors. The process 700 may include determining an adequate isolation region. An adequate isolation region may be an amount of space sufficient to prevent data recorded to one band from interfering with tracks of an adjacent band. An adequate isolation region may comprise one or more sectors to create a buffer between sectors of adjacent bands. The isolation region may comprise one or more whole, partially filled, or fractional tracks.

In the process 700, an operation 702 formats a data storage medium to include a plurality of bands, each band of the plurality of bands including a plurality of tracks, the plurality of tracks including a subset of top tracks interlaced with a subset of bottom tracks, and each track of the plurality of tracks including a number of sectors. An operation 704 iteratively formats a Nth band of the plurality of bands, the Nth band occupying a number of top tracks and a number of bottom tracks. An operation 706 determines an isolation region adjacent to the Nth band. At operation 708, if additional bands are to be iteratively formatted adjacent to the determined isolation region, then return to operation 704; if not, end at operation 710.

Figure 8:
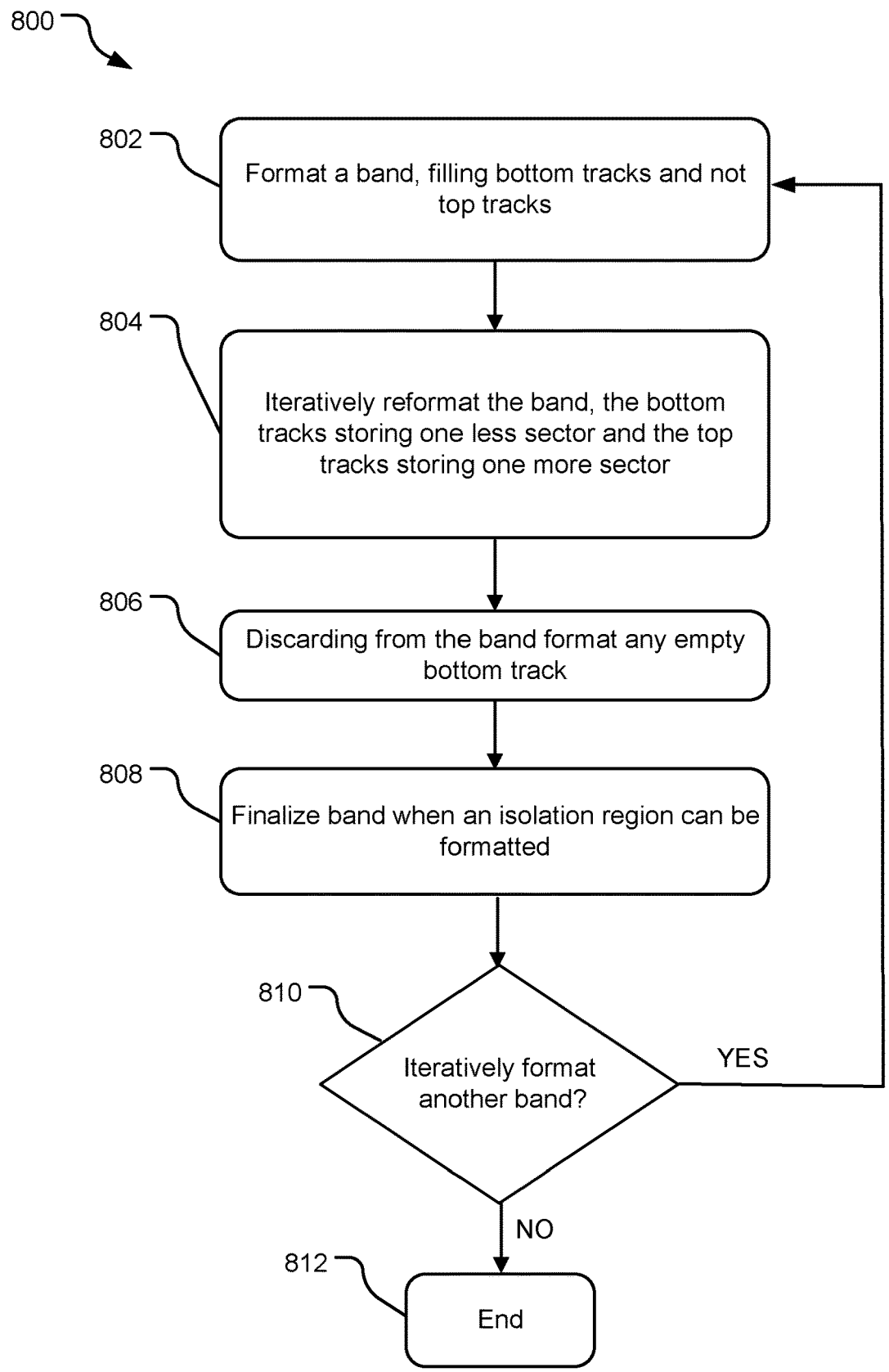
FIG. 8 is a flowchart of example operations for allocating logical sectors to IMR bands via an iterative supposition process.

A flowchart of operations is shown in FIG. 8 as process 800; this process 800 provides exemplary alternate details compared to the operations 702, 704, 706 of the process 700. Particularly, FIG. 8 is a flowchart of example operations for allocating logical sectors to IMR bands via an iterative supposition process, stopping when an isolation region can be formatted. Note that FIG. 6 is the specific guidance as to when an isolation region can be formatted.

In an operation 802, a band is supposedly formatted, by filling bottom tracks and not interlaced top tracks. In an operation 804, the band from the operation 802 is reformatted, by iteratively storing one less sector in the bottom tracks and one more sector in the top tracks. In an operation 806, any empty bottom track is discarded from the band. In operation 808, the band is finalized when an isolation region can be formatted.

Subsequent to the operation 808, if another band is to be iteratively formatted at operation 810, the process returns to the operation 802; if not, end at operation 812. In such a manner, an entire disc can be formatted with bands.

Figure 9:
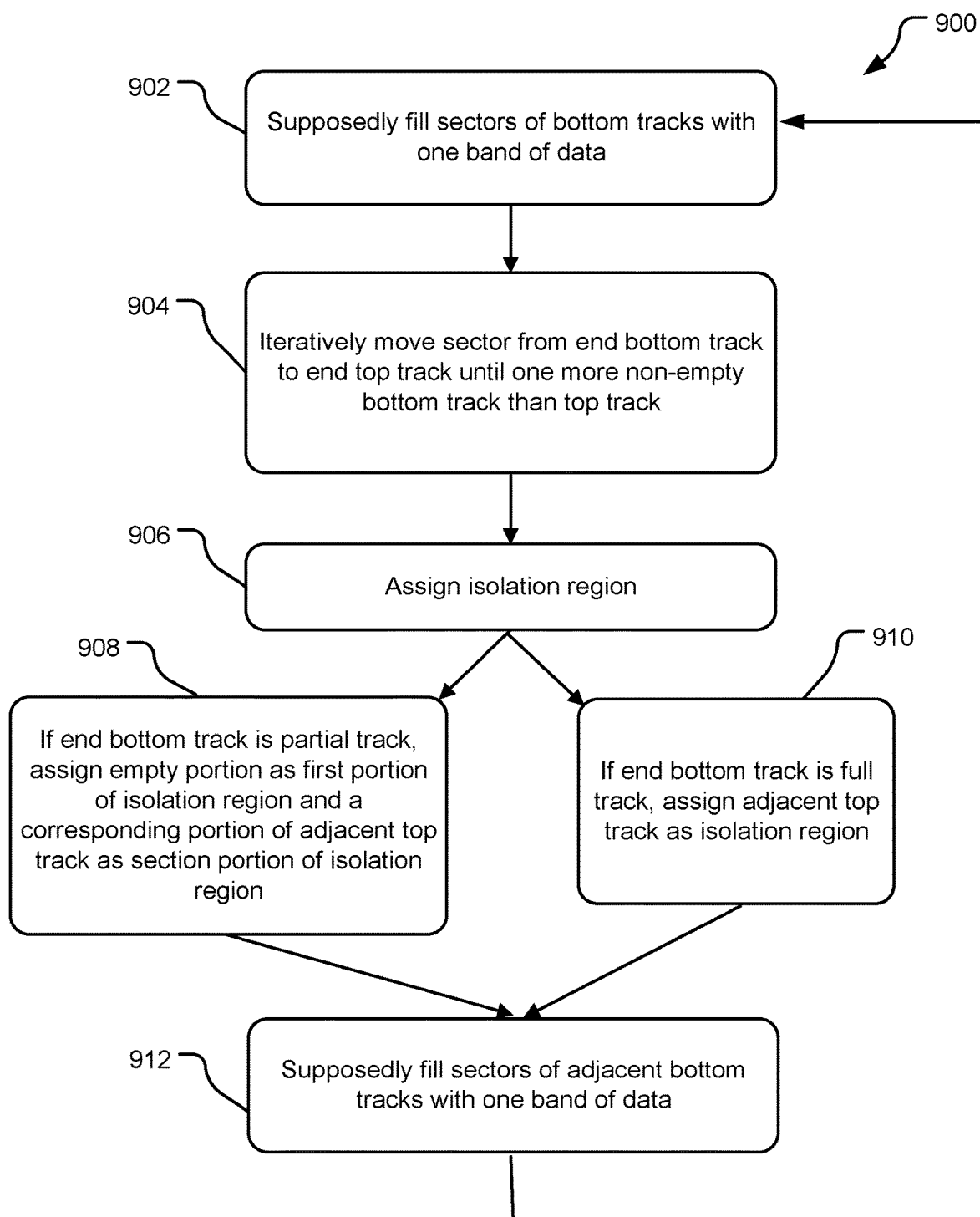
FIG. 9 is a flowchart of example operations for allocating logical sectors to IMR bands via an iterative supposition process.

Another flowchart of operations is shown in FIG. 9 as process 900; this process 900 provides other exemplary alternate details compared to the operations 702, 704, 706 of the process 700.

In an operation 902, sectors of a series of bottom tracks are supposedly filled with one band of data. In an operation 904, individually, sectors from the end bottom track are iteratively moved to the interlaced end top track until there is one more non-empty bottom track than top track. The operation 904 thus results in a consolidated band. In an operation 906, after determining the band in the operation 904, an isolation region is assigned. If the end bottom track of the band is a partial track, in the operation 908 the empty portion of the partial track is assigned as a first portion of the isolation region and a corresponding portion of an adjacent trop track is assigned as a second portion of the isolation region. Alternately, if the end bottom track or top track is a partial track, the empty portion is assigned as a first portion of an isolation region and a circumferentially complementary portion of the adjacent top track or adjacent bottom track, respectively), as the second portion of the isolation region. If the end bottom track of the band is a full track, in an operation 910 the adjacent top track is assigned as the isolation region. Alternately, if the end bottom or top track is a full track, the adjacent top or bottom track, respectively, is assigned as the isolation region.

After assigning the isolation region in the operation 908 or 910, the next band is determined, beginning with an operation 912 where sectors of adjacent bottom tracks are supposedly filled with one band of data. This operation 912 corresponds to operation 902 which leads to the subsequent operations, where another band is formatted and the isolation region is assigned. The process 900 can be continued until the desired number of bands has been formatted, e.g., an entire disc.

FIG. 6 provides detailed guidance as to when to stop iterative supposition, and all of FIGS. 7, 8 and 9 provide various example operations for allocating disc space in the storage medium by identifying a boundary of the first band and separating writable tracks of different bands is provided. In all processes, the practitioner is directed to perform iterative supposition, stopping when an isolation region can be formatted.

Figure 10:
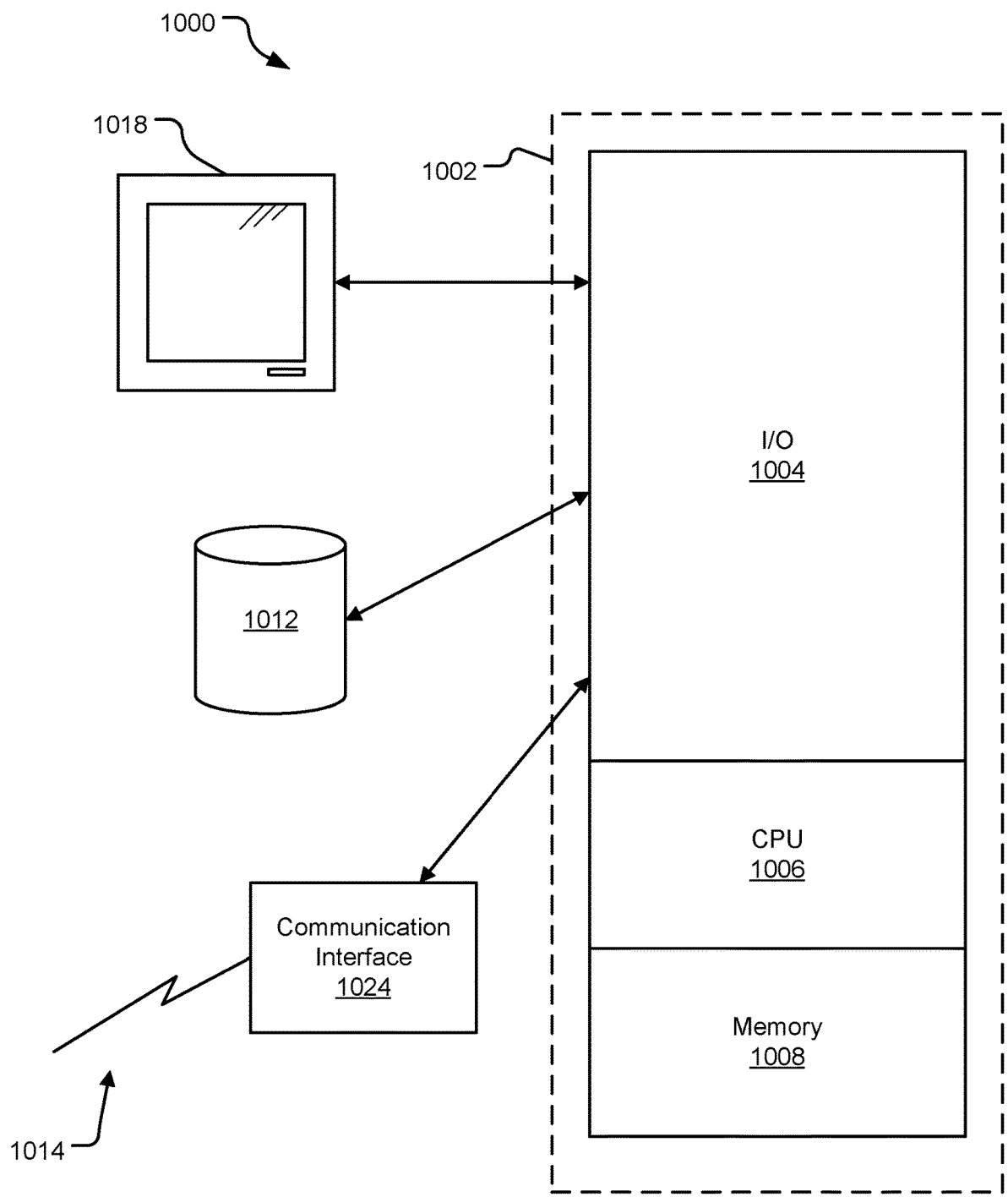
FIG. 10 is a block diagram of a computer system in a data storage system.

Referring to FIG. 10, a block diagram of a computer system 1000 suitable for implementing one or more aspects of a system is shown. The computer system 1000 is capable of executing a computer program product embodied in a tangible computer-readable storage medium to execute a computer process. The computer process may include allocating logical sectors to store interlaced magnetic recording bands. Data and program files may be input to the computer system 1000, which reads the files and executes the programs therein using one or more processors. Some of the elements of a computer system 1000 are shown in FIG. 10 wherein a processor 1002 is shown having an input/output (I/O) section 1004, a Central Processing Unit (CPU) 1006, and a memory section 1008. There may be one or more processors 1002, such that the processor 1002 of the computing system 1000 comprises a single central-processing unit 1006, or a plurality of processing units. The processors may be single core or multi-core processors. The computing system 1000 may be a conventional computer, a distributed computer, or any other type of computer. The described technology is optionally implemented in software loaded in memory 1008, a disc storage unit 1012, and/or communicated via a wired or wireless network link 1014 on a carrier signal (e.g., Ethernet, 3G wireless, 5G wireless, LTE (Long Term Evolution)) thereby transforming the computing system 1000 in FIG. 10 to a special purpose machine for implementing the described operations.

The I/O section 1004 may be connected to one or more user-interface devices (e.g., a keyboard, a touch-screen display unit 1018, etc.) or a disc storage unit 1012. Computer program products containing mechanisms to effectuate the systems and methods in accordance with the described technology may reside in the memory section 1004 or on the storage unit 1012 of such a system 1000.

A communication interface 1024 is capable of connecting the computer system 1000 to an enterprise network via the network link 1014, through which the computer system can receive instructions and data embodied in a carrier wave. When used in a local area networking (LAN) environment, the computing system 1000 is connected (by wired connection or wirelessly) to a local network through the communication interface 1024, which is one type of communications device. When used in a wide-area-networking (WAN) environment, the computing system 1000 typically includes a modem, a network adapter, or any other type of communications device for establishing communications over the wide area network. In a networked environment, program modules depicted relative to the computing system 800 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module and other modules may be embodied by instructions stored in memory 1008 and/or the storage unit 1012 and executed by the processor 1002. Further, local computing systems, remote data sources and/or services, and other associated logic represent firmware, hardware, and/or software, which may be configured to assist in obtaining and processing media clips. A media clipper system may be implemented using a general purpose computer and specialized software (such as a server executing service software to a workstation or client), a special purpose computing system and specialized software (such as a mobile device or network appliance executing service software), or other computing configurations. In addition, clipper media parameters may be stored in the memory 1008 and/or the storage unit 1012 and executed by the processor 1002.

The computer system 1000 may include a variety of tangible processor-readable storage media and intangible processor-readable communication signals. Tangible processor-readable storage can be embodied by any available media that can be accessed by the computer system 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by the computer system 1000. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Thus, also provided in this disclosure is system having a storage medium in a storage device including a plurality of bands, each band including a plurality of tracks, each track of the plurality of tracks including a number of sectors; and a controller. The controller is configured to examine possible isolation regions of a first band via a process of iterative supposition, determine an isolation region of the first band, allocate disc space in the storage medium for subsequent bands on the opposite side of the isolation region of the first band; and write on the separately writable tracks of different bands. The controller may be further configured to shift (during the iterative supposition) the boundary of the first band by shifting one sector at a time from a bottom track to a top track, such as to fill the top track and/or empty the bottom track. The controller may be further configured to fill the track adjacent to the endmost (e.g., rightmost) top track, empty the endmost (e.g., rightmost) bottom track, and add a single top track of band isolation.

At some stage during the iterative supposition process, the endmost (e.g., rightmost) top track and bottom track are partially full. Additionally, at some states during the iterative supposition process, the endmost (e.g., rightmost) top track is full.

The implementations of the iterative supposition process described herein are implemented as logical steps in one or more computer systems 1000. The logical operations of the iterative supposition process are implemented (1) as a sequence of processor-implemented steps executed in one or more computer systems and (2) as interconnected machine or circuit modules within one or more computer systems. The implementation is a matter of choice, dependent on the performance requirements of the computer system implementing the iterative supposition process. Accordingly, the logical operations making up the iterative supposition process are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification and examples provide a complete description of the structure and use of exemplary implementations of the iterative supposition process. Since many implementations of the iterative supposition process can be made without departing from the spirit and scope of the invention, the invention resides in the claims hereinafter appended.

What is claimed is:

1. A data storage formatting method comprising:
    filling, with supposed data, a subset of bottom tracks comprising sectors interlaced with a subset of top tracks comprising sectors;
    iteratively moving supposed data from a sector of the subset of bottom tracks to a sector of the subset of top tracks until a number of empty top tracks inward from an end non-empty bottom track is zero; and
    assigning an isolation region responsive to a determination that the subset of bottom tracks has a non-full track, assigning that portion of the non-full track as a first portion of the isolation region, and assigning a corresponding portion of an adjacent top track as a second portion of the isolation region, or,
    responsive to a determination that the subset of bottom tracks does not have a non-full track, assigning no more than an entire adjacent top track as the isolation region.

2. The method of claim 1, wherein prior to filling the subset of bottom tracks, determining defective sectors of the subset of bottom tracks, and filling the sectors of the subset of bottom tracks avoiding the defective sectors.

3. The method of claim 1, wherein prior to iteratively moving supposed data, determining defective sectors of the subset of top tracks, and filling the sectors of the subset of top tracks avoiding the defective sectors.

4. The method of claim 1, comprising:
    filling the subset of bottom tracks left to right with supposed data;
    iteratively moving and filling supposed data from a sector of a right-most bottom track of the subset of bottom tracks to a sector of the left-most track of the subset of top tracks, until N=0 or 1, where N is the number of empty top tracks to the left of the right-most non-empty bottom track; and
    assigning the isolation region responsive to a determination if the right-most bottom track is a non-full track, assigning that portion of the non-full track as a first portion of the isolation region, and assigning a circumferentially complementary portion of an adjacent top track as a second portion of the isolation region.

5. The method of claim 1, comprising:
    filling the subset of bottom tracks left to right with supposed data;
    iteratively moving and filling supposed data from a sector of a right-most bottom track of the subset of bottom tracks to a sector of the left-most track of the subset of top tracks, until N=0 or 1, where N is the number of empty top tracks to the left of the right-most non-empty bottom track; and
    assigning the isolation region responsive to a determination if the right-most bottom track is not a non-full track, assigning an adjacent top track as the isolation region.

6. The method of claim 1, further comprising after assigning an isolation region:
    filling a next subset of bottom tracks with second supposed data;
    iteratively moving second supposed data from a sector of the next subset of bottom tracks to a sector of a next subset of top tracks, until the number of empty top tracks inward from the end non-empty bottom track is zero; and
    assigning a next isolation region responsive to a determination if the next subset of bottom tracks has a non-full track, assigning that portion of the non-full track as a first portion of the next isolation region, and assigning a corresponding portion of an adjacent top track as a second portion of the next isolation region, or, if the next subset of bottom tracks does not have a non-full track, assigning an adjacent top track as the next isolation region.

7. The method of claim 6, wherein prior to filling the next subset of bottom tracks, determining defective sectors of the next subset of bottom tracks, and filling the sectors of the next subset of bottom tracks avoiding the defective sectors.

8. The method of claim 6, wherein prior to iteratively moving second supposed data, determining defective sectors of the next subset of top tracks, and filling the sectors of the next subset of top tracks avoiding the defective sectors.

9. A controller for a disc drive assembly configured to format a data storage medium of the assembly, the controller configured to:
fill a subset of bottom tracks comprising sectors interlaced with a subset of top tracks comprising sectors with supposed data;
iteratively move supposed data from a sector of the subset of bottom tracks to a sector of the subset of top tracks, until a number of empty top tracks inward from an end non-empty bottom track is zero; and
assign an isolation region responsive to a determination that the subset of bottom tracks has a non-full track, assign that portion of the non-full track as a first portion of the isolation region, and assign a corresponding portion of an adjacent top track as a second portion of the isolation region, or if the subset of bottom tracks does not have a non-full track, assign no more than an entire adjacent top track as the isolation region.

10. The controller of claim 9 configured to, prior to filling the subset of bottom tracks, determine defective sectors of the subset of bottom tracks, and fill the sectors of the subset of bottom tracks avoiding the defective sectors.

11. The controller of claim 9 configured to, prior to iteratively moving supposed data, determine defective sectors of the subset of top tracks, and fill the sectors of the subset of top tracks avoiding the defective sectors.

12. The controller of claim 9 further configured to:
fill the subset of bottom tracks left to right with supposed data;
iteratively move and filling supposed data from a sector of a right-most bottom track of the subset of bottom tracks to a sector of the right-most track of the subset of top tracks, until N=0 or 1, where N is the number of empty top tracks to the left of the right-most non-empty bottom track; and
assign an isolation region responsive to a determination if the right-most bottom track is a non-full track, assign that portion of the non-full track as a first portion of the isolation region, and assign a circumferentially complementary portion of an adjacent top track as a second portion of the isolation region.

13. The controller of claim 9 further configured to:
fill the subset of bottom tracks left to right with supposed data;
iteratively move and filling supposed data from a sector of a right-most bottom track of the subset of bottom tracks to a sector of the right-most track of the subset of top tracks, until N=0 or 1, where N is the number of empty top tracks to the left of the right-most non-empty bottom track; and
assign an isolation region responsive to a determination if the right-most bottom track is not a non-full track, assign an adjacent top track as the isolation region.

14. The controller of claim 9 further configured to, after assigning an isolation region:
fill a next subset of bottom tracks with second supposed data;
iteratively move second supposed data from a sector of the next subset of bottom tracks to a sector of a next subset of top tracks, until the number of empty top tracks inward from the end non-empty bottom track is zero; and
assign a next isolation region responsive to a determination if the next subset of bottom tracks has a non-full track, assign that portion of the non-full track as a first portion of the next isolation region, and assign a corresponding portion of an adjacent top track as a second portion of the next isolation region, or if the next subset of bottom tracks does not have a non-full track, assign an adjacent top track as the next isolation region.

15. A controller for a disc drive assembly configured to format a data storage medium of the assembly, the controller comprising:
means to fill a subset of bottom tracks comprising sectors interlaced with a subset of top tracks comprising sectors with supposed data;
means to iteratively move supposed data from a sector of the subset of bottom tracks to a sector of the subset of top tracks, until a number of empty top tracks inward from an end non-empty bottom track is zero; and
means to, responsive to a determination that the subset of bottom tracks has a non-full track:
assign an isolation region,
assign that portion of the non-full track as a first portion of the isolation region, and
assign a corresponding portion of an adjacent top track as a second portion of the isolation region, or
means to, responsive to a determination that the subset of bottom tracks does not have a non-full track, assign no more than an entire adjacent top track as the isolation region.

16. The controller of claim 15 configured to, prior to filling the subset of bottom tracks, determine defective sectors of the subset of bottom tracks, and fill the sectors of the subset of bottom tracks avoiding the defective sectors.

17. The controller of claim 15 configured to, prior to iteratively moving supposed data, determine defective sectors of the subset of top tracks, and fill the sectors of the subset of top tracks avoiding the defective sectors.

18. The controller of claim 15 further configured to:
fill the subset of bottom tracks left to right with supposed data;
iteratively move and filling supposed data from a sector of a right-most bottom track of the subset of bottom tracks to a sector of the right-most track of the subset of top tracks, until N=0 or 1, where N is the number of empty top tracks to the left of the right-most non-empty bottom track; and
assign an isolation region responsive to a determination if the right-most bottom track is a non-full track, assign that portion of the non-full track as a first portion of the isolation region, and assign a circumferentially complementary portion of an adjacent top track as a second portion of the isolation region.

19. The controller of claim 15 further configured to:
fill the subset of bottom tracks left to right with supposed data;
iteratively move and filling supposed data from a sector of a right-most bottom track of the subset of bottom tracks to a sector of the right-most track of the subset of top tracks, until N=0 or 1, where N is the number of empty top tracks to the left of the right-most non-empty bottom track; and assign an isolation region responsive to a determination if the right-most bottom track is not a non-full track, assign an adjacent top track as the isolation region.

20. The controller of claim 15 further configured to, after assigning an isolation region:

fill a next subset of bottom tracks with second supposed data;

iteratively move second supposed data from a sector of the next subset of bottom tracks to a sector of a next subset of top tracks, until the number of empty top tracks inward from the end non-empty bottom track is zero; and assign a next isolation region responsive to a determination if the next subset of bottom tracks has a non-full track, assign that portion of the non-full track as a first portion of the next isolation region, and assign a corresponding portion of an adjacent top track as a second portion of the next isolation region, or if the next subset of bottom tracks does not have a non-full track, assign an adjacent top track as the next isolation region.

\* \* \* \* \*